3,222,266
METHOD OF ENAMELING ANODIZED ALUMINUM
Harold A. Page, Spokane, Wash., assignor to Kaiser Aluminum & Chemical Corporation, Oakland, Calif., a corporation of Delaware
No Drawing. Filed Aug. 20, 1958, Ser. No. 756,081
13 Claims. (Cl. 204—38)

This invention relates to a method for producing porcelain or vitreous enamel coatings on aluminum and aluminum base alloys and articles produced thereby. More particularly, this invention relation relates to a method for producing adherent vitreous enamel coatings on aluminum and aluminum base alloys capable of admitting the passage of light characterized by freedom from staining of the aluminum base metal wherein the lustre of the aluminum metal surface may be seen through the coating and articles produced thereby.

The expression "capable of admitting the passage of light" as used herein in connection with "vitreous enamel coatings" means coatings which are either transparent or translucent.

By way of illustration, and not limitation, examples of enamel compositions and methods of performing the enameling step per se that may be employed in the method of this invention are disclosed in U.S. Patents Nos. 2,467,114, 2,642,364, 2,653,877 and 2,800,414.

The enameling of aluminum by the above and other prior art methods possesses certain inherent disadvantages with regard to staining of the aluminum metal, and spalling or flaking off of the enamel. It has been found that, with the enameling frits according to the above patents and with many others, it is possible to produce clear enamel coatings. However, when such coatings are applied to aluminum, the aluminum metal to which the coatings are applied becomes badly stained by the application of the enamel. Since the enamel coating is clear, this staining can be seen in the finished product and accordingly, an unattractive product is obtained. Further, while procelain or vitreous enameled aluminum has been successfully employed in many environments, in the presence of water or moisture such enamels do not adhere tenaciously. The principal difficulty encountered is referred to as "water-spalling" and is evidenced by a flaking-off of the enamel.

Accordingly, it is an object of this invention to provide a method for producing vitreous enamel coatings on aluminum metal whereby the disadvantages of the prior art methods are eliminated or substantially reduced.

It is a further object of this invention to provide a method for producing vitreous enamel coatings on aluminum metal capable of admitting the passage of light characterized by freedom or substantial freedom from staining of the aluminum base metal whereby the bright lustre of the aluminum metal may be seen through the enamel coating.

It is a further object of this invention to provide a method for producing vitreous enamel coatings on aluminum wherein problems of water spalling and flaking are eliminated or substantially reduced.

It is a further object of this invention to provide a method for producing water-spall resistant vitreous enamel coatings an aluminum metal capable of admitting the passage of light characterized by freedom or substantial freedom from staining of the aluminum metal wherein the lustre of the aluminum metal surface may be seen through the enamel coating.

It is a further object of this invention to provide an aluminum base article having a vitreous enamel coating adhering thereto characterized by resistance to water-spalling and flaking.

It is a further object of this invention to provide an aluminum base article having a vitreous enamel coating thereon capable of admitting the passage of light characterized by a pleasing appearance due to the lustre of a stain free or substantially stain free surface on the aluminum metal which may be seen through the enamel coating.

It is a still further object of this invention to provide an aluminum base article having a water-spall resistant vitreous enamel coating thereon capable of admitting the passage of light characterized by a pleasing appearance due to the lustre of a stain free surface on the aluminum metal which may be seen through the enamel coating.

This invention comprises a method for producing porcelain or vitreous enamel coatings on aluminum wherein after the usual cleaning step, the aluminum is coated with a stain inhibiting film. After coating with such a film, the enamel is applied in a conventional manner. Where a clear or translucent enamel coating is to be applied, it may be desirable to brighten the aluminum prior to the application of the stain inhibiting film. For some applications a desirable appearance may be produced by etching the aluminum metal prior to the application of a stain inhibiting film. An attractive finish may be produced by ordinary mill brightening, mechanical polishing, buffing, etc. It has been found that bright dip baths, particularly the nitric acid fluoride type, such as disclosed in U.S. Patents 2,719,079, 2,719,781 and 2,620,265 not only brighten the metal but also produce a stain inhibiting film embodying the principles of this invention on many aluminum alloys. On such alloys, the metal treated in such brightening solutions may be immediately enameled with a clear or translucent enamel. The film produced by these brightening treatments not only inhibits the stain but it has been found that it also promotes water spall resistance. A stain inhibiting film embodying the principles of this invention may also be produced by anodizing the surface of the aluminum through a conventional anodizing treatment.

While it has been found that an attractive appearance is obtained by applying either a bright dipping treatment or an anodizing treatment, superior results are obtained by applying a bright dip treatment followed by an anodizing treatment.

It has been found that the application of the stain inhibiting film in accordance with the principles of this invention produces desirable results not only with colorless clear or translucent enamels but also with colored clear or translucent enamels. Articles having very pleasing appearances have been produced using various colorless or colored clear or translucent enamels whereby the natural bright lustre of the aluminum may be seen through the enamel coating.

Examples of satisfactory pretreatment procedures embodying the principles of this invention are set forth below, it being understood that the conventional water rinsing operations after the various steps are not recited.

(1) Clean metal in an inhibited alkaline cleaner.

(2) Treat metal according to a suitable bright dipping process. Satisfactory results have been obtained by the use of a process of the type disclosed in U.S. Patents 2,620,265, 2,719,079 and 2,719,781. Such a process comprises dipping the metal for a period of from 1 to 10 minutes in an aqueous acid solution containing fluoride ions and nitric acid in concentrations equivalent to from about 0.5 to 25 grams per liter of ammonium fluoride and from about 1.3 to 106 cc. per liter of aqueous nitric acid solution containing 70% $HNO_3$ by weight and ions of a metal electropositive to hydrogen in amounts equivalent to not substantially less than 0.001 gram per liter of copper. Such metal ions may be included by the addition of not substantially less than about 0.03 gram per liter of $Cu(NO_3)_2 \cdot 3H_2O$. This solution is maintained at a temperature of from 80 to 105° C. The fluoride ions may be simple or complex fluoride ions. Where complex fluoride ions such as fluoborate ions are employed, amounts equivalent to from about 0.3 to about 26 cc. per liter of aqueous fluoboric acid solution containing 45% $HBF_4$ by weight should be employed. Other substances such as disclosed in U.S. Patent 2,620,265 may be effectively employed in the solution.

(3) Rinse in 5% by volume nitric acid solution.

(4) Anodize according to a conventional anodizing treatment. For example, anodize for 1 to 15 minutes in a 15% sulfuric acid electrolyte at room temperature, i.e., about 72° F., using a current density of from 10 to 15 amperes per square foot and a voltage of from about 12 to 18 volts. In general, current density and voltage are interrelated functions although the relationship varies with the cell and anodizing conditions. Accordingly, anodizing may be carried out by maintaining either the voltage or the current density within the specified range. Anodizing solutions other than sulfuric acid may be used, e.g., oxalic acid or other conventional anodizing solutions.

(5) Enamel with any porcelain or vitreous enamel having a melting point below about 580° C. Good results have been obtained by the use of enamels of the types disclosed in the patents referred to hereinbefore. Some of these enamels have compositions as indicated in Composition I below:

COMPOSITION I

| | Mole percent |
|---|---|
| PbO | 10 to 18 |
| $SiO_2$ | 38 to 65 |
| $Li_2O$ | 5 to 12 |
| $Na_2O$ | 0 to 22 |
| $K_2O$ | 0 to 20 |
| $TiO_2$ | 0 to 11 | the total alkali metal oxide content $$(Li_2O + Na_2O + K_2O)$$

of the enamel being between 25 and 36 mole percent and the ratio of the sum of the silica content and twice the titanium oxide content of the enamel to the total alkali metal oxide content of the enamel being between 1.8 and 3.0 all of said oxides being melted into the enamel composition. However, ceramic pigments, refractory materials and other constituents also may be contained in the enamel composition. In the enameling step, enamel is applied to the aluminum (by spraying on or dipping the aluminum in an aqueous slip and drying at low temperatures, for example) and then fired above the fusing point of the enamel at a temperature between 400 and 580° C., in some cases, preferably at a temperature between 500 and 540° C. for a period between 2 and 30 minutes. Additional coats of enamel may be provided by repeating the enameling step.

Other enamels of the types disclosed in the patents referred to hereinbefore have compositions as indicated under Composition II below:

COMPOSITION II

Group A

| | Cationic mole percent |
|---|---|
| $ZrO_2$ | 0.5 to 5 |
| $TiO_2$ | 0 to 9 |
| $ZrO_2 + TiO_2$ | 3 to 10 |
| $SiO_2$ | 0 to 5 |
| $AlO_{1.5}$ | 4 to 16 |

Group B

| | |
|---|---|
| $BO_{1.5}$ | 13 to 25 |
| $PO_{2.5}$ | 15 to 30 |

Group C

| | |
|---|---|
| $LiO_{0.5}$ | 7 to 20 |
| $KO_{0.5}$ | 3 to 15 |
| $NaO_{0.5}$ | 0 to 20 |
| CaO | 0 to 10 |
| BaO | 0 to 10 |
| CaO + BaO | 0 to 15 |

To illustrate the balance of inorganic constituents required in the enameling frits of Composition II, cationic mole percentages are used. According to this method of designating relative proportions, any given oxide unit is considered as having one metal atom as the cation. An enameling frit composition as a whole is considered as being one cationic mole in value. If individual elements are present in this composition in presumptively fluoride form, the cationic mole percent of the element is still calculated on an oxygen equivalent basis.

As a matter of convenience, and in accordance with standard practice in this art, the cationic constituents are represented as combined with split atoms of oxygen. It is, of course, realized that the form of these constituents in the enameling frit and in the enamels is not definitely known.

The total content of zirconium and titanium oxide in Group A must range from 3 to 10 cationic mol percent of the total enameling composition. Titanium oxide may be omitted from any particular composition, but if it is omitted zirconium oxide must be present within the required range, i.e., between approximately 3 to 5 cationic mole percent.

The enamels produced by the use of Compositions I and II are clear and colorless. However, clear colored and translucent or translucent colored enamels may be produced by adding to a melt of the glasses produced with Compositions I and II various metallic oxides known in the art to produce colored glasses. Examples of such oxides are $MnO_2$ and CoO. Clear colored and translucent colored enamel coatings may also be obtained by the use of many prior art vitreous enamel compositions known to produce clear colored enamel coatings. In some instances, steps 2 and 3 may be dispensed with and an article characterized by pleasing appearance may still be produced. Certain desirable special effects may be achieved by treatments such as etching in lieu of brightening. With some aluminum alloys, an article characterized by pleasing appearance may be produced by the use of step 2 without the use of step 4. For best results, however, it is preferred to employ both step 2 and step 4.

As specific examples of the invention, specimens of various aluminum alloys including sheets, extrusions and castings were treated as follows: The alloys employed were commercial aluminum alloys with the ranges fixed by the Aluminum Association as indicated in Table I below:

TABLE I

| Alloy | Al | Cu | Fe | Si | Mn | Mg | Zn | Cr | Ti | Other Elements | |
|---|---|---|---|---|---|---|---|---|---|---|---|
| | | | | | | | | | | Each | Total |
| 1099 | 99.00 Min | | | | | | | | | | |
| 1100 | 99.0 Min | | | | | | | | | | |
| 1080 | 99.80 Min | | | | | | | | | | |
| 3003 | Bal | 0.20 | 0.70 | 0.60 | 1.0-1.5 | | 0.10 | | | 0.05 | 0.15 |
| 4043 | Bal | 0.30 | 0.80 | 4.5-6.0 | 0.05 | | 0.10 | | 0.20 | 0.05 | 0.15 |
| 5005 | Bal | 0.20 | 0.7 | 0.40 | 0.20 | 0.50-1.1 | 0.25 | 0.10 | | 0.05 | 0.15 |
| 5052 | Bal | 0.10 | | | 0.10 | 2.2-2.8 | 0.10 | 0.15-0.35 | | 0.05 | 0.15 |
| 6061 | Bal | 0.15-0.40 | 0.70 | 0.4-0.8 | 0.15 | 0.8-1.2 | 0.20 | 0.15-0.35 | | 0.05 | 0.15 |
| 7072 | Bal | 0.10 | | | 0.10 | | 0.75-1.25 | | | 0.05 | 0.15 |
| 6063 | Bal | 0.10 | 0.35 | 0.2-0.6 | | 0.45-0.85 | 0.10 | 0.10 | 0.10 | 0.05 | 0.15 |

A group of samples of aluminum alloys 1080, 1090, 1100 and 3003, having compositions as indicated in Table I were cleaned with an inhibited alkaline cleaner to a water break-free surface and rinsed in cold water. This cleaner was a solution containing 4 oz. of sodium hydroxide, 4 oz. of sodium metasilicate and ½ oz. of "Nacconol N.R.," an alkyl, aryl sulfonate detergent dissolved in one gallon of water. Next the samples were dipped in a brightening solution containing 12 grams per liter $NH_4F$, 68 cc. per liter of aqueous nitric acid solution containing 70% $HNO_3$ by weight and 0.1 gram per liter of $Cu(NO_3)_2 \cdot 3H_2O$ contained in a 20 liter rectangular battery jar equipped with stirring devices. The temperature of the solution was 93° C. and the panels were maintained in the solution for 4 minutes. These samples were then rinsed in a 5 cc. per liter aqueous solution of nitric acid, water rinsed and allowed to dry. Next, a portion of the samples were sprayed with a slip of Du Pont's enamel No. L 388. The remaining samples were sprayed with a slip of Minnesota Mining and Manufacturing Company's enamel No. 8101. The enamel slip so applied on the specimens was dried in air and the enameled aluminum was then fired at a temperature of 530° C. for about 5 minutes and air cooled. The samples enameled as above described had a pleasing appearance due to the lustre of a stain free surface on the aluminum metal beneath the clear enamel. Sheet samples of each alloy were tested for water-spalling by filing two edges in order to expose the bare aluminum. These samples were bent over a ¾" mandrel before subjecting them to the accelerated water-spall test. All panels were immersed in 20 liters of 5% ammonium chloride solution contained in a Lucite tank at ambient room temperature. Evaluations of both the bent and flat areas were conducted after 24 to 48 hours of exposure. By far the greater majority of the samples showed no failures, i.e., spalling or flaking off. Those which showed some signs of failure or flaking off under these accelerated test conditions had such failures extending no more than ⅛" in from the edge and not more than ½" along the edge.

A second group of samples of aluminum alloys 1080, 1099, 1100 and 3003 having compositions as indicated in Table I were cleaned in the above described inhibited alkaline cleaner to a water break free surface and rinsed in cold water. Next, the samples were dipped in a brightening solution containing 5.3 cc. per liter of aqueous fluoboric acid solution containing 45% $HBF_4$ by weight, 32 cc. per liter of aqueous nitric acid solution containing 70% $HNO_3$ by weight and .05 gram per liter $Cu(NO_3)_2 \cdot 3H_2O$ contained in a 20 liter rectangular battery jar equipped with stirring devices. The temperature of the solution was 93° C. and the panels were maintained in the solution for 4 minutes. The samples were then rinsed in a 5 cc. per liter aqueous solution of nitric acid, water rinsed and allowed to dry. Next, a portion of the samples were sprayed with a slip of Du Pont's enamel No. L 388. The remaining samples were sprayed with a slip of Minnesota Mining and Manufacturing Company's enamel No. 8101. The enamel slip so applied on the samples was dried in air and the enameled aluminum was then fired at a temperature of 530° C. for about 5 minutes and air cooled. The samples enameled as above described had a pleasing appearance due to the lustre of a stain free surface on the aluminum metal beneath the clear enamel. Sheet samples of each alloy were tested for water spalling by filing two edges in order to expose the bare aluminum. These samples were bent over a ¾" mandrel before subjecting them to the accelerated water spall test. All panels were immersed in 20 liters of 5% ammonium chloride solution contained in a Lucite tank at ambient room temperature. Evaluations of both the bent and flat areas were conducted after 24 and 48 hours of exposure. By far the greater majority of the samples showed no failures, i.e., spalling or flaking off. Those which showed some signs of failure or flaking off under these accelerated test conditions had such failures extending no more than ⅛" in from the edge and not more than ½" along the edge.

A third group of samples of aluminum alloys 1080, 1099, 1100 and 3003 having compositions as indicated in Table I were cleaned in the above described inhibited alkaline cleaner to a water break free surface and rinsed in cold water. Next, the samples were dipped in a brightening solution containing 4.1 grams per liter $CrO_3$, 6.2 grams per liter $NH_4HF_2$, 2.4 grams per liter sugar, 0.13 gram per liter $Cu(NO_3)_2$, and 52.0 cc. per liter of aqueous nitric acid solution containing 70% $HNO_3$ by weight contained in a 20 liter rectangular battery jar equipped with stirring devices. The temperature of the solution was 93° C. and the panels were maintained in the solution for 4 minutes. The samples were then rinsed in a 5 cc. per liter aqueous solution of nitric acid, water rinsed and allowed to dry. Next, a portion of the samples were sprayed with a slip of Du Pont's enamel No. L 388. The remaining samples were sprayed with a slip of Minnesota Mining and Manufacturing Company's enamel No. 8101. The enamel so applied on the specimen was dried in air and the enameled aluminum was then fired at a temperature of 530° C. for about 5 minutes and air cooled. The samples enameled as above described had a pleasing appearance due to the lustre of a stain free surface on the aluminum metal beneath the clear enamel. Sheet samples of each alloy were tested for water spalling by filing two edges in order to expose the bare aluminum. These samples were bent over a ¾" mandrel before subjecting them to the accelerated water spall test. All panels were immersed in 20 liters of 5% ammonium chloride solution contained in a Lucite tank at ambient room temperature. Evaluations of both the bent and flat areas were conducted after 24 and 48 hours of exposure. By far the greater majority of the samples showed no failures, i.e., spalling or flaking off. Those which showed some signs of failure or flaking off under these accelerated test conditions had such failures extending no more than ⅛" in from the edge and not more than ½" along the edge.

A fourth group of samples of aluminum alloys 1099, 1100, 5005, 5052, 3003, 6061, 7072, 4043 and 6063 having compositions as indicated in Table I were cleaned in the above described inhibited alkaline cleaner to a water break free surface and rinsed in cold water. Next, the samples were anodized for five minutes in a 15% sulfuric acid electrolyte contained in a 30 gallon rectangular tank equipped with stirring devices and lead cathodes, and at a temperature of 72° F. The current density was maintained constant at 12 amperes per square foot. The voltage required to maintain this current density varied as anodizing progressed. In general, the voltage was about 15 volts. The anodized coatings were water rinsed and allowed to drip dry. After drying, a portion of the samples were enameled by spraying with a slip of Du Pont's enamel No. L 388. The remaining samples were enameled by spraying with a slip of Minnesota Mining and Manufacturing Company's enamel No. 8101. Since the above enamels are colorless enamels, a small amount of $MnO_2$ was smelted with frit of each of the above enamels and refritted. This colored frit was ground into the slip and sprayed onto the samples. This produced a clear reddish brown enamel. The enamel so applied on the specimens was dried in air and the enameled aluminum was then fired at a temperature of about 530° C. for about 5 minutes and air cooled. The samples enameled by the above method had a pleasing appearance due to the lustre of a stain free surface on the aluminum metal beneath the clear enamel.

A fifth group of samples of aluminum alloys 3003, 4043, 6061, 7072, 1100, 5005, 5052, 6063 and 1099 having compositions as indicated in Table I were cleaned in the above described inhibited alkaline cleaner to a water break-free surface and rinsed in cold water. Next, the samples were dipped in a brightening solution containing 12 grams per liter $NH_4F$, 68 cc. per liter of aqueous nitric acid solution containing 70% $HNO_3$ by weight and 0.1 gram per liter of $Cu(NO_3)_2 \cdot 3H_2O$ contained in a 20 liter rectangular battery jar equipped with stirring devices. The temperature of the solution was 93° C. and the panels were maintained in the solution for 4 minutes. The samples were then rinsed in a 5 cc. per liter aqueous solution of nitric acid, water rinsed and allowed to dry. Next, they were anodized for five minutes in a 15% sulfuric acid electrolyte contained in a 30 gallon rectangular tank equipped with stirring devices and lead cathodes, and at a temperature of 72° F. The current density employed was 12 amperes per square foot. The voltage required to maintain this current density varied as anodizing progressed. In general, the voltage was about 15 volts. The anodized coatings were water rinsed and allowed to drip dry. After drying, a portion of the samples were enameled by spraying with a slip of Du Pont's enamel No. L 388. The remaining samples were enameled by spraying with a slip of Minnesota Mining and Manufacturing Company's enamel No. 8101. Since the above enamels are colorless enamels, a small amount of CoO was smelted with frit of these enamels and refritted. This colored frit was ground into slip and sprayed onto the samples. This produced a clear blue enamel. The enamel so applied on the specimen was dried in air and the enameled aluminum was then fired at a temperature of about 530° C. for about 5 minutes and air cooled. The samples enameled by the above method had a pleasing appearance due to the lustre of a stain free surface on the aluminum metal beneath the clear enamel.

As used herein the term "aluminum" is meant to cover high purity aluminum, commercial purity aluminum and aluminum alloys.

It will be understood that various changes, omissions, and additions may be made to this invention without departing from the spirit and scope thereof as set forth in the appended claims.

What is claimed is:

1. A method for producing vitreous enamel coatings on aluminum metal which comprises treating the aluminum metal in an aqueous acid solution containing fluoride ions and nitric acid in concentrations equivalent to from about 0.5 to 25 grams per liter of ammonium fluoride and from about 1.3 to 106 cc. per liter of an aqueous nitric acid solution containing 70% $HNO_3$ by weight and thereafter enameling the aluminum with a vitreous enamel.

2. A method for producing water spall resistant vitreous enamel coatings on aluminum metal which comprises treating the aluminum metal in an aqueous acid solution containing fluoride ions and nitric acid in concentrations equivalent to from about 0.5 to 25 grams per liter of ammonium fluoride and from about 1.3 to 106 cc. per liter of aqueous nitric acid solution containing 70% $HNO_3$ by weight and ions of a metal electropositive to hydrogen in amounts equivalent to not substantially less than 0.001 gram per liter of copper and thereafter enameling the aluminum with a vitreous enamel having a melting point below about 580° C. by applying the enamel to the aluminum and firing the same above the fusing point of the enamel at a temperature of from about 400 to 580° C.

3. A method for producing clear vitreous enamel coatings on aluminum metal characterized by being water spall resistant and having freedom from staining of the aluminum base metal, which comprises treating the aluminum metal in an aqueous acid solution containing fluoride ions and nitric acid in concentrations equivalent to from about 0.5 to 25 grams per liter of ammonium fluoride, from about 1.3 to 106 cc. per liter of aqueous nitric acid solution containing 70% $HNO_3$ by weight and ions of a metal electropositive to hydrogen in amounts equivalent to not substantially less than 0.001 gram per liter of copper at a temperature of from about 85 to 105° C. for a period of from about 1 to 10 minutes and thereafter enameling the aluminum with a clear vitreous enamel having a melting point below about 580° C. by applying the enamel to the aluminum and firing the same above the fusing point of the enamel at a temperature of from about 400 to 580° C.

4. A method for producing vitreous enamel coatings on aluminum metal which comprises treating the aluminum metal in an aqueous acid solution containing complex fluoride ions and nitric acid in concentrations equivalent to from about 0.3 to 26 cc. per liter of aqueous fluoboric acid solution containing 45% $HBF_4$ by weight, from about 1.3 to 106 cc. per liter of aqueous nitric acid solution containing 70% $HNO_3$ by weight and ions of a metal electropositive to hydrogen in amounts equivalent to not substantially less than 0.001 gram per liter of copper and enameling the aluminum metal with a vitreous enamel.

5. A method for producing clear vitreous enamel coatings on aluminum metal characterized by being water spall resistant and having freedom from staining of the aluminum base metal, which comprises treating the aluminum metal in an aqueous acid solution containing complex fluoride ions and nitric acid in concentrations equivalent to from about 0.3 to 26 cc. per liter of aqueous fluoboric acid solution containing 45% $HBF_4$ by weight, from about 1.3 to 106 cc. per liter of aqueous nitric acid solution containing 70% $HNO_3$ by weight and ions of a metal electropositive to hydrogen in amounts equivalent to not substantially less than 0.001 gram per liter of copper at a temperature of from about 80 to 105° C. for a period from about 1 to 10 minutes and thereafter enameling the aluminum metal with a clear vitreous enamel having a melting point below about 580° C. by applying the enamel to the aluminum and firing same above the fusing point of the enamel at a temperature of from about 400 to 580° C.

6. A method for producing vitreous enamel coatings on aluminum metal which comprises treating the aluminum metal in an aqueous acid solution containing fluoride ions and nitric acid in concentrations equivalent to from about 0.5 to 25 grams per liter of ammonium fluoride and from about 1.3 to 106 cc. per liter of aqueous nitric acid solution containing 70% $HNO_3$ by weight, anodizing the treated aluminum metal and thereafter enameling said aluminum metal with a vitreous enamel.

7. A method for producing vitreous enamel coatings on aluminum metal which comprises treating the aluminum metal in an aqueous acid solution containing fluoride ions and nitric acid in concentrations equivalent to from about 0.5 to 25 grams per liter of ammonium fluoride and from about 1.3 to 106 cc. per liter of aqueous nitric acid solution containing 70% $HNO_3$ by weight and ions of a metal electropositive to hydrogen in amounts equivalent to not substantially less than 0.001 gram per liter of copper, anodizing the treated aluminum metal in a sulfuric acid electrolyte, and thereafter enameling said aluminum metal with a vitreous enamel having a melting point below about 580° C. by applying the enamel to the aluminum and firing the same above the fusing point of the enamel at a temperature of from about 400 to 580° C.

8. A method for producing clear vitreous enamel coatings on aluminum metal characterized by freedom from staining of the aluminum base metal which comprises treating the aluminum in an aqueous acid solution containing fluoride ions and nitric acid in concentrations equivalent to from about 0.5 to 25 grams per liter of ammonium fluoride and from about 1.3 to 106 cc. per liter of aqueous nitric acid solution containing 70% $HNO_3$ by weight and ions of a metal electropositive to hydrogen in amounts equivalent to not substantially less than about 0.001 gram per liter of copper at a temperature of from about 80 to 105° C. for a period of from about 1 to 10 minutes, anodizing the treated aluminum for a period of from about 1 to 15 minutes in a 15% sulfuric acid electrolyte at room temperature, at a current density of from about 10 to 15 amperes per square foot and at a voltage of from about 12 to 18 volts and thereafter enameling the aluminum with a clear vitreous enamel having a melting point below about 580° C. by applying the enamel to the aluminum and firing the same above the fusing point of the enamel at a temperature of from about 400 to 580° C.

9. A method of coating aluminum with vitreous enamel which comprises electro-chemically producing an anodic aluminum oxide film having a thickness of from about 0.0002 to about 0.00005 inch on said aluminum, directly coating at least a portion of said film with a fusible vitreous material, and heating the coated film to at least the fusion temperature of said vitreous material.

10. A method of coating aluminum with vitreous enamel which comprises electro-chemically producing an anodic aluminum oxide film having a thickness of from about 0.0002 to about 0.00005 inch, directly coating at least a portion of said film with a vitreous material which is fusible at a temperature of from about 950° Fahrenheit to about 1076° Fahrenheit and heating the coated film to the fusion temperature of said vitreous material.

11. A method for producing vitreous enamel coatings on aluminum metal, said coatings being capable of admitting the passage of light and being characterized by being water-spall resistant and having substantial freedom from staining of the aluminum base metal, said method comprising anodizing the aluminum surface from about one to fifteen minutes in a sulfuric acid electrolyte at room temperature at a current density of from about 10 to 15 amperes per square foot and thereafter enameling the aluminum with a vitreous enamel having a melting point below about 580° C. by applying the enamel to the aluminum and firing the same above the fusing point of the enamel at a temperature of from about 400 to 580° C.

12. A composite article produced by the method of claim 1.

13. A composite article produced by the method of claim 11.

References Cited by the Examiner

UNITED STATES PATENTS

| | | | |
|---|---|---|---|
| 2,040,618 | 5/1936 | Mason et al. | 204—33 |
| 2,108,603 | 2/1938 | Mason | 204—33 |
| 2,544,139 | 3/1951 | Deyrup et al. | 117—53 X |
| 2,683,113 | 7/1954 | Prance et al. | 204—38 X |
| 2,719,079 | 9/1955 | Murphy | 41—42 |
| 2,719,781 | 10/1955 | Hesch | 41—42 |
| 2,719,796 | 10/1955 | Kappes et al. | 117—53 |
| 2,721,835 | 10/1955 | Axtell | 204—38 |

JOHN H. MACK, *Primary Examiner.*

JOSEPH B. SPENCER, RICHARD D. NEVIUS, JOSEPH REBOLD, *Examiners.*